United States Patent
Cheung

Patent Number: 5,404,542
Date of Patent: Apr. 4, 1995

[54] POWER LINE SWITCHING CIRCUIT WITH MONITOR

[75] Inventor: Anthony Cheung, Fremont, Calif.

[73] Assignee: Everex Systems, Inc., Fremont, Calif.

[21] Appl. No.: 600,438

[22] Filed: Oct. 19, 1990

[51] Int. Cl.⁶ ............................................. G06F 1/26
[52] U.S. Cl. ..................... 395/750; 395/575; 364/273.5; 364/DIG. 1; 364/948.4; 364/DIG. 2
[58] Field of Search ......... 395/750, 575, 275; 364/707, 273.5, DIG. 1, 948.4, 948.91, DIG. 2; 371/66, 12, 14

[56] References Cited

U.S. PATENT DOCUMENTS

| | | | |
|---|---|---|---|
| 4,171,539 | 10/1979 | Tawfik et al. | 395/750 |
| 4,371,789 | 2/1983 | Chen et al. | 307/38 |
| 4,593,349 | 6/1986 | Chase et al. | 395/750 |
| 4,642,479 | 2/1987 | Lombardi et al. | 307/141 |
| 4,747,041 | 5/1988 | Engel et al. | 395/750 |
| 4,779,007 | 10/1988 | Schlanger et al. | 307/66 |
| 4,794,525 | 12/1988 | Pickert et al. | 395/750 |
| 4,803,592 | 2/1989 | Ashley | 371/29.1 |
| 4,931,978 | 6/1990 | Drake et al. | 364/708 |
| 5,051,720 | 9/1991 | Kittirutsunetorn | 340/310 R |
| 5,163,124 | 11/1992 | Yabe et al. | 395/750 |
| 5,191,323 | 3/1993 | Abbes et al. | 340/825.37 |
| 5,229,942 | 7/1993 | Nicholson et al. | 364/424.03 |

Primary Examiner—Debra A. Chun
Assistant Examiner—Glenn A. Auve
Attorney, Agent, or Firm—Blakely, Sokoloff, Taylor & Zafman

[57] ABSTRACT

A power line coupling and decoupling circuit for furthering peripheral system reliability. The circuit is used in a computer system which includes a host computer attached to a peripheral system via a SCSI communication interface. A light emitting diode is used as a monitor to indicate the power level on the SCSI interface. A mechanical slide switch is used to then couple or decouple a peripheral system's power source and the SCSI interface thus preventing electrical short circuits and current surges within the peripheral system. The SCSI interface receives its power directly from the peripheral power source and not from a peripheral device assembled within the peripheral system.

29 Claims, 4 Drawing Sheets

FIG_1A (PRIOR ART)

FIG_1B (PRIOR ART)

FIG_2A

FIG_2B

FIG_5

POWER LINE SWITCHING CIRCUIT WITH MONITOR

BACKGROUND OF THE INVENTION

1. Field of the Invention

The field of the invention is that of a power line switching circuit for a communication interface line between a host computer and peripheral system. The present invention is specifically advantageous for interfaces using the American National Standard for Information Systems Small Computer System Interface Specification or (ASCII/SCSI) X3T9.2/82-2.

2. Description of Related Art

Many peripheral systems are designed to interface with host computers, specifically the Apple Macintosh® computer "(Macintosh®)". These peripheral systems provide extended capability for the Macintosh® computer by providing expanded memory, magnetic or optical disk data storage, printing means, image scanning ability, and backup disk data storage (tape drive). Referring now to prior art FIG. 1(A), generally a peripheral system 220 includes a peripheral device 210 (in this case a hard drive), an internal power supply 200 for the peripheral device 210 and various connecting and interfacing means 212 that enable the peripheral system 220 to communicate with other systems. All of these components are within one outer covering and are collectively called a "peripheral" or a "peripheral system" for a host computer.

Peripheral systems connect directly to the host computer and communicate with the host by way of a communication interface or protocol which will be expanded upon further below. Designers of peripheral systems create their systems to operate with the particular communication interface accepted by the host computer. Therefore, host computer users can universally connect to the host computer any manufacturer's peripheral system that uses the host's same communication interface. This interface method greatly expands the scope of peripheral compatibility with the host computer. The communication interface may be comprised of a wire cable, interface hardware, and special processing software. All three elements are uniquely designed to operate under a specific communication protocol. The wire cable described connects the peripheral system to the host computer by a physical means and is made up of many independent wires (also called lines or pins). Together the interface hardware and software provide the mechanism for sending and receiving binary data which is electrically transmitted over the wire cable between the host computer and the peripheral system.

Figure 1B:
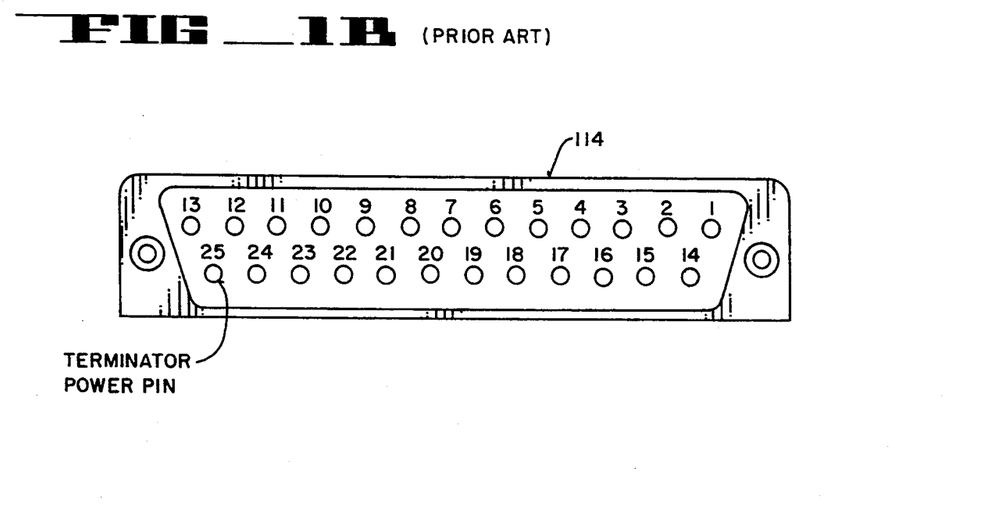
FIG. 1(B)is a detailed illustration of the prior art SCSI 25 pin interface connector adapted for the Apple Macintosh ® computer.
Figure 2A:
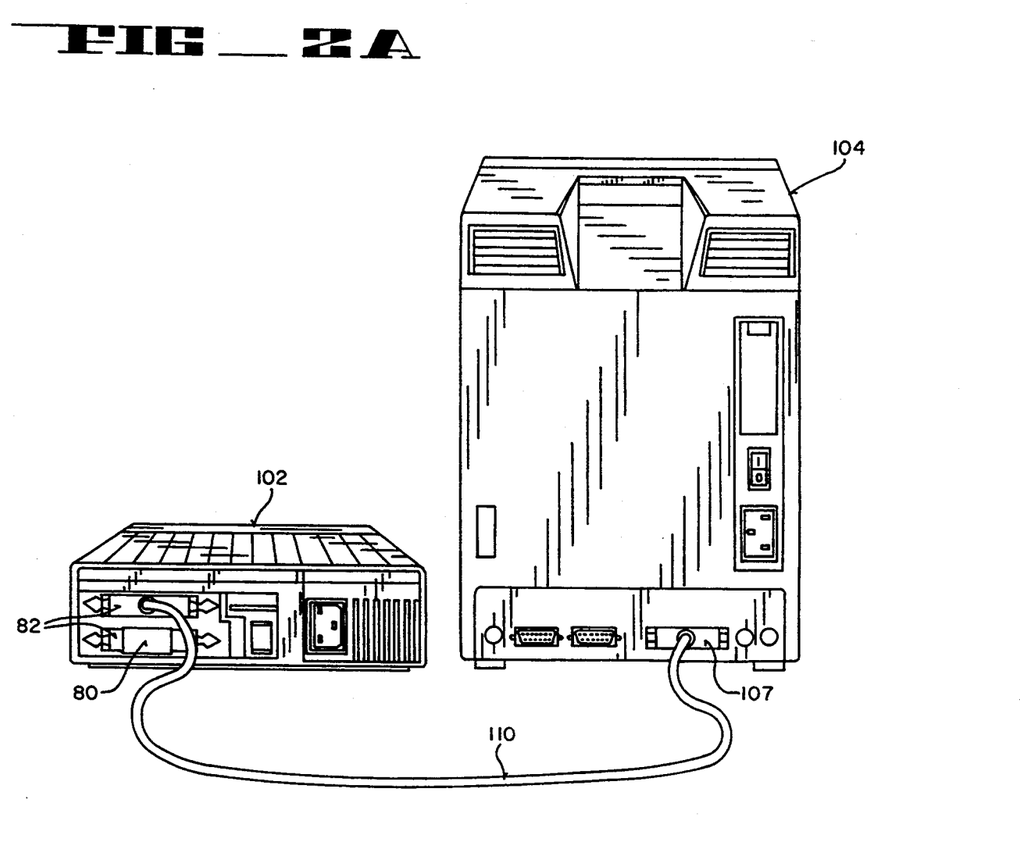
FIG. 2(A) is an illustration showing a host computer (Macintosh ® computer) and is peripheral and the attachment arrangement of the SCSI port communication interface between them.
Figure 2B:
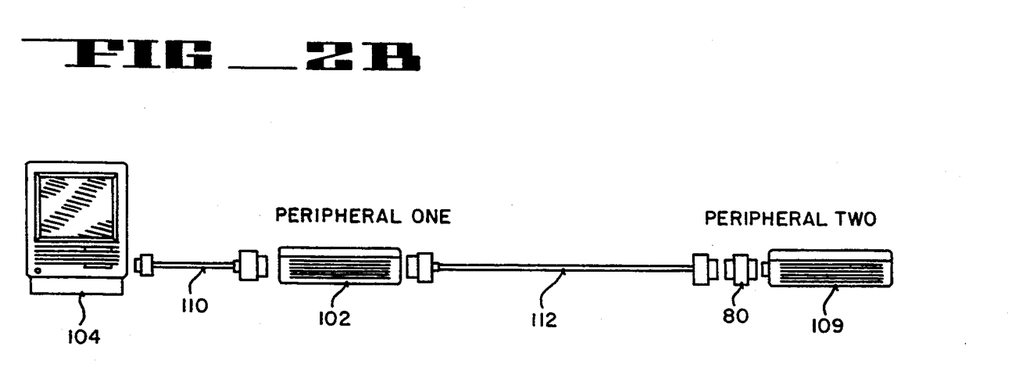

The communication protocol advantageously used with the present invention is the SCSI (pronounced "SKUH-zee") standard which is used in the Apple Macintosh® line of computers (Macintosh® Plus, Macintosh® SE, and Macintosh® II family) and has also been widely adapted by many other brands of computers via plug-in adapters to communicate with the host systems. SCSI stands for Small Computer Systems Interface and is a high speed, parallel communication interface defined by the American National Standards Institute. The SCSI interface is designed to connect a variety of tape drives, printers, disk drives, scanners, and other peripherals with the Macintosh® computer. The SCSI wire cable is made up of a plurality of different insulated, parallel lines (or pins) all of which are connected on both ends with one of a variety of interface connectors. The connector adapted for the Macintosh® computer, illustrated in FIG. 1(B), is made tap of 25 pins. On the peripheral system side of the interface, the connector adapted for the peripheral system has 50 pins (25 of these are grounded and not used). One of these SCSI pins is designated as a "terminator power pin" (or "power pin") and preferably carries a 4.5 to 5.5 volt DC power level. Refer to FIG. 2(B). The function of the terminator power pin is to provide power for the termination resistor network 80 typically located at the end of the SCSI bus in a chain of peripherals. The terminator resister network 80 conditions certain signal lines on the SCSI bus. The terminator resistor network 80 can be built into a peripheral system, or can be applied to the peripheral as an external module that plugs into the SCSI bus at the end of a peripheral chain, see arrangement in FIG. 2(B). The terminator power pin on the Macintosh® computer side of the interface is illustrated on FIG. 1(B) as pin number 25. As shown by the present invention in FIG. 2(A), the SCSI connector is adapted to fit into the Macintosh® computer SCSI port 107 located on back of the computer 104. The other connector is placed into the peripheral system's communication port 82 located on the back of the peripheral system 102.

It has been discovered that one problem with current peripheral system design is that the possibility of short circuiting the peripheral devices through the SCSI interface has not been considered fully. Refer to the prior art FIG. 1(A). To date, within the peripheral system 220, peripheral device 210 is connected to peripheral power source 200. The peripheral device 210 is also directly connected to the terminator power pin of the SCSI communication line 212 via a diode 214 which prevents current flow back into the peripheral device 210. In order to power the SCSI interface terminator power pin, power from the peripheral power source 200 is channeled through the peripheral device 210 then through the current regulating diode 214. From the diode 214, the power flows to the terminator power pin of the SCSI interface cable 212. Thus, it has been discovered that short circuits may occur when either (i) the cable is inserted incorrectly or (ii) before it is connected to the prior art peripheral system 220, the terminator power pin already carries power from some alternate source, but at a voltage lower than that supplied by peripheral system 220, causing excessive current to flow through diode 214. The resulting short circuit may create a damaging current surge through (and out of) the peripheral device 210 that could render the peripheral system 220 inoperative.

As one aspect of the present invention, it is realized that the short circuiting problem of the SCSI communication interface exists at least because on the Macintosh® computer the power state of the terminator power pin is unknown. Further, it is now realized that many short circuits may be avoided with knowledge of the power state of this terminator power pin. The Apple Macintosh® line of computers consists of several different models (Macintosh® Plus, Macintosh® SE, and Macintosh® II family), on these various models some of their SCSI interfaces carry power on file terminator power pin and some models do not, leaving terminator power pin disconnected. For example, one model of Macintosh® computer that does not supply power on the terminator power pin, leaving it unconnected, is the Macintosh ® Plus. The nonuniform power state of terminator power pin causes a major problem for peripheral designers because the power state of the terminator power pin on the SCSI communication interface for the Macintosh ® computer is unknown or ambiguous. To deal with this problem, peripheral manufactures connect the SCSI terminator power pin to the peripheral's internal power source. However, since several families of Macintosh ® computers also independently place power on the terminator power pin, these two power sources (connected in parallel) will compete to level their voltages.

The short circuit problem becomes more acute when several peripherals (via the SCSI communication interface) are connected to the Macintosh ® computer in "daisy chain" fashion as shown in FIG. 2(B). The host computer 104 is connected to peripheral "one" 102 via SCSI cable 110, then from peripheral "one" 102 to peripheral "two" 109 via SCSI cable 112. Both peripherals 102,109 use the same SCSI interface line to communicate with the host computer 104. Since all SCSI lines are configured in parallel in the daisy chain scheme, power from one peripheral power supply (located in peripherals 102 and 109) will be applied to the SCSI terminator power pin and across all components in the daisy chain, including the Macintosh ® computer 104. If several peripheral systems are attached in parallel then the power supplies of all peripherals will also be connected in parallel via the terminator power pin of the SCSI cable. Again, it is realized by the present invention that a problem exists because peripheral power supplies connected in parallel will increase the probability of: short circuit failures; excessive forward bias current through the diodes; and/or current surges as each power supply operates to force the other parallel voltage to a constant and equalized level.

In reference to the above, peripheral manufactures cannot anticipate whether or not there will be power on the terminator power pin of the SCSI connector because: (i) not all host computers (such as the Macintosh ® computer) supply power on the terminator power pin; and (ii) the daisy chain parallel configuration of multiple peripheral systems allows any peripheral system to supply power across terminator power pin of the entire SCSI interface. Furthermore, the design of present peripheral systems provides no mechanism for dealing with the ambiguous power levels associated with the terminator power pin of the SCSI interface.

Figure 1A:
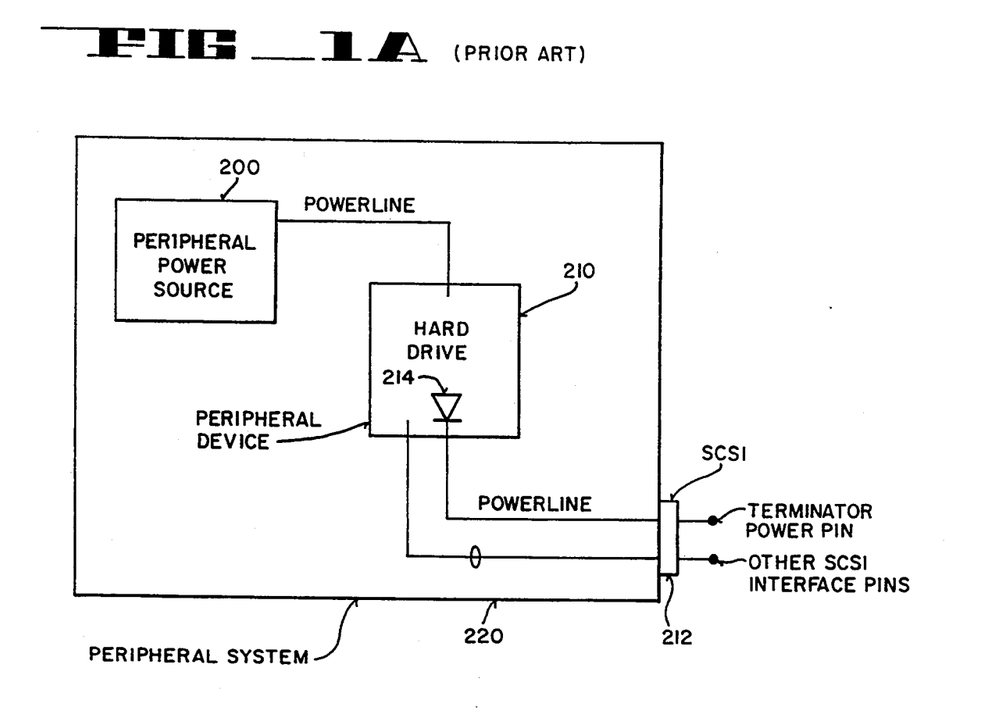
FIG. 1(A) is a block diagram of the prior art configuration of the SCSI communication interface on a peripheral system.

Refer to FIG. 1(A). Additionally, the protective features of prior art peripheral systems 220 are inadequate to protect the peripheral devices 210 from short circuits related to the SCSI terminator power pin. This type of short circuit causes current to surge out of the peripheral device 210 thus damaging its internal components. In the prior art, the current regulating diode 214 only protects the peripheral device 210 from current flow into the peripheral device 210 and not current flow out of the peripheral device 210. However, the present invention discloses methods and means preventing hazardous current flow out of a peripheral system onto a SCSI interface line which may permanently damage the peripheral system.

It is therefore an object of the present invention to develop a new circuit that can sense the power level on a terminator power pin of a SCSI line using a monitor such as a light emitting diode (LED). Depending on this power level, the present invention provides a switch to either connect an internal peripheral power source to or disconnect it from the SCSI communication line. Once the peripheral power source is disconnected from the SCSI line, no shorting condition can arise as a result of current from the SCSI terminator power pin. The advantage to this arrangement is that if power is not supplied on the SCSI line from the Macintosh ® computer, or from any other peripheral device connected on the SCSI bus, then the peripheral LED will not light and the switch can be used to connect the peripheral's internal power source to the terminator power pin of the SCSI line and the SCSI interface will operate normally. Alternatively, if power already exists on the SCSI terminator power pin then the peripheral LED will illuminate and no power needs to be supplied from the peripheral system. The switch is then open to disconnect the peripheral's internal power source from the SCSI line. In this configuration no shorting can occur in the peripheral system as a result of the SCSI terminator power pin since the power lines have been disconnected.

Another object of the present invention is to provide a circuit that does not connect power lines (terminator power pin) between the peripheral device and the SCSI communication interface, as practiced by the prior art. As seen in the prior art FIG. 1(A), the peripheral device 210 is coupled directly to the terminator power pin of the SCSI interface connector 212 by a power line. This power line coupling scheme is not implemented in the present invention. Instead the present invention, by decoupling the power lines between the SCSI interface and the peripheral device, increases the reliability of the entire peripheral system by lessening the chances of a peripheral device short circuit through the SCSI interface terminator power pin.

Another object of the present invention is to increase peripheral system reliability by protecting the peripheral system 102 from current surges through the communication port by utilizing a replaceable fuse coupled to the SCSI terminator power pin. The prior art, refer to FIG. 1(A), does not provide a fuse link on the power line between the SCSI port 212 and the peripheral device 210. Therefore, the present invention has additional reliability over the prior art due to the fuse application.

SUMMARY OF THE INVENTION

A power line switching circuit for a peripheral system which is adapted to interface with a host computer is described. This switching circuit utilizes a first power line originating from a power source. A switch is used to either electrically connect or disconnect this first power line and a second power line. A monitor is used to indicate whether or not this second power line is coupled to the peripheral system's power source through the first power line and switch or to any other power source.

In the preferred embodiment of the power line switching circuit the switch is a mechanical slide switch and the monitor is a light emitting diode. Further, the second power line in this preferred embodiment is connected to a termination pin forming part of a SCSI communication interface.

A power line circuit for use within a peripheral system adapted to interface with a host computer is also described: this system includes a power driven active peripheral device and a peripheral power source for this device. The circuit comprises pins means adapted to connect the peripheral system with a host computer and power line means for coupling the pin means with the peripheral power source. The circuit also comprises power line means from the peripheral power source to the pin means while bypassing the peripheral device so as to electrically isolate the device from the pin means.

BRIEF DESCRIPTION OF THE DRAWINGS

FIG. 2(B is an illustration of the daisy chain attachment arrangement of several peripheral systems and a host computer.

DESCRIPTION OF THE PREFERRED EMBODIMENT

The present invention describes a power line switching circuit with power monitor. In the following description numerous specific details are set forth in order to provide a thorough understanding of the present invention. However, it will be obvious to one skilled in the art that the present invention may be practiced without these specific details. In other instances well known circuits and methods have not been described in detail as not to unnecessarily obscure the present invention.

The location and physical configuration of the present invention are described as follows. As shown in FIG. 2(A), the preferred embodiment circuitry of the present invention is placed within a peripheral system 102 and coupled to a SCSI port 82, via the terminator power pin (not shown), from within the peripheral system 102. In a one peripheral system, the other SCSI connector of port 82 is connected to an external terminator module ("termination resistor network") 80 which is required if the peripheral system 102 does not have its own build-in SCSI terminator module. The peripheral system 102 selected for the preferred embodiment contains an external hard disk device which is coupled to a host computer such as the Macintosh ® computer 104 available from Apple Computers, Inc. of Cupertino, Calif. However, any peripheral device may be used with equal advantage.

Figure 3:
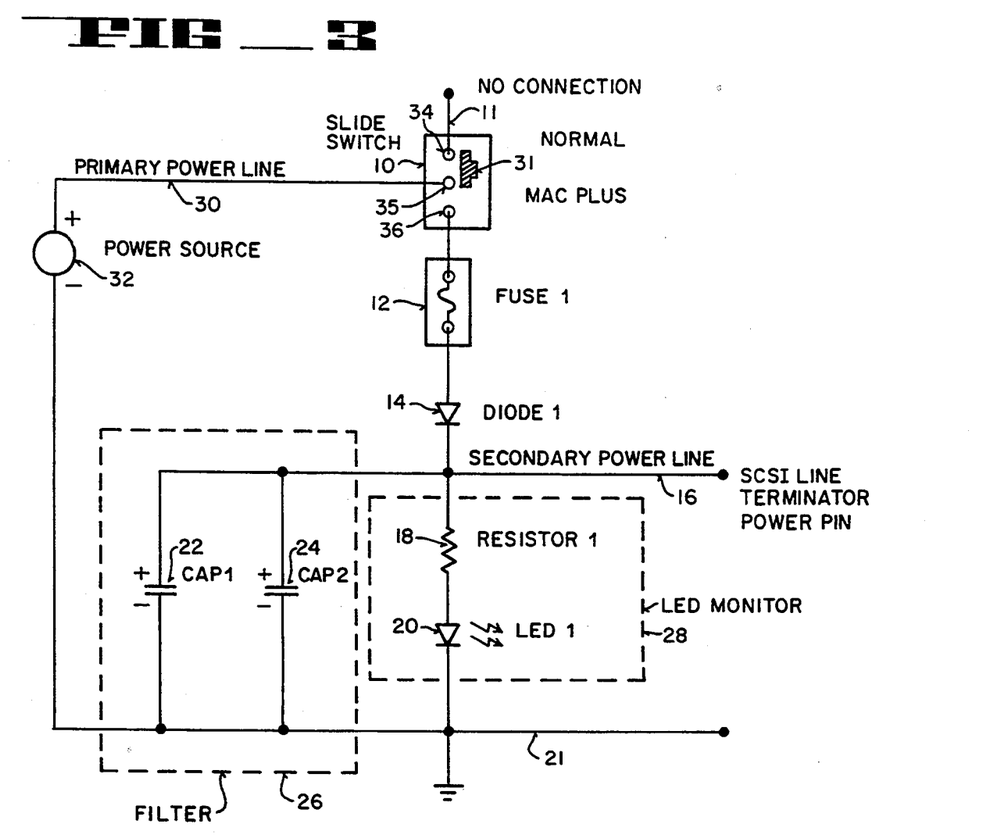
FIG. 3 is a detailed electronic circuit schematic of the present invention showing the components of the design.

The preferred embodiment of the present invention is detailed in the schematic found in FIG. 3. Generally, a primary power line 30 is coupled to an internal power supply 32 of a peripheral system 102. This primary power line 30 is either coupled to or decoupled from a secondary power line 16 by use of a slide switch 10, or any alternative switching means such as a mechanical or electrical switch. The secondary power line couples to the SCSI interface terminator power pin using a standard multi-pin parallel SCSI connector at the point indicated ("SCSI Line") in the circuit schematic.

A positive lead of the internal power source 32, rated at 5 volts DC level is coupled to the primary or internal power line 30. The negative lead of this power supply 32 is coupled to ground 21. The power line 30 is the same power line that supplies the peripheral device 67 (hard disk) as shown in the block diagram of FIG. 4. The power line 30 of FIG. 3 is also coupled to a center lead 35 of a three lead slide switch 10. A lead 36 of the slide switch 10 is coupled to a first lead of fuse 12. Lead 36 of the switch corresponds to the MAC PLUS configuration side as indicated. The last lead 34 of the slide switch 10 is not coupled. Lead 34 of the switch corresponds to the NORMAL configuration side as indicated. The slide switch 10 is shown here in the NORMAL configuration with the slider 31 connecting both leads 34 and 35. If in the MAC PLUS configuration, the slider 31 would be in the below position, connecting leads 35 and 36.

As shown in FIG. 3, a second lead of the fuse 12 (standard 1.0 amp) is coupled to the anode of a diode 14. In the preferred embodiment, the diode 14 used is part number IN5817. The cathode of the diode 14 is coupled to the secondary power line 16. The diode is coupled such that current flows in the direction from fuse 12 to the secondary power line 16, but current will not flow back from the secondary power line 16 to the fuse 12.

The secondary power line 16 is coupled to a first lead of a 330 ohm low power resistor 18 (power rating less then 1 watt). A second lead of the resistor 18 is coupled to the anode of a low voltage (2–5 volt) light emitting diode (LED) 20. The cathode of the LED 20 is coupled to ground. The LED is coupled such that when a 5 volt level is applied to the secondary power line 16, the LED will emit light. The series arrangement of the resistor 18 and the LED 20 comprises the LED monitor arrangement 28 as indicated by a broken line box.

According to FIG. 3, the secondary power line 16 is coupled to the positive lead of the 10 uF capacitor 22. A negative lead of the 10 uF capacitor 22 is coupled to ground 21. The secondary power line 16 is also coupled to a positive lead of the 0.1 uF capacitor 24. A negative lead of the 0.1 uF capacitor is coupled to ground 21. In this arrangement both capacitors 22,24 are connected in parallel. The parallel combination of the capacitor 22 and the capacitor 24 comprise the filter arrangement 26 as indicated by a broken line box. The filter arrangement 26 operates to sink to ground any voltage spikes caused by the switching of the power lines 16 and 30. As indicated in FIG. 3, the secondary power line 16 is also coupled to the terminator power pin of the SCSI communication interface connector located on the exterior of the peripheral system (FIG. 4, connector 82).

Figure 4:
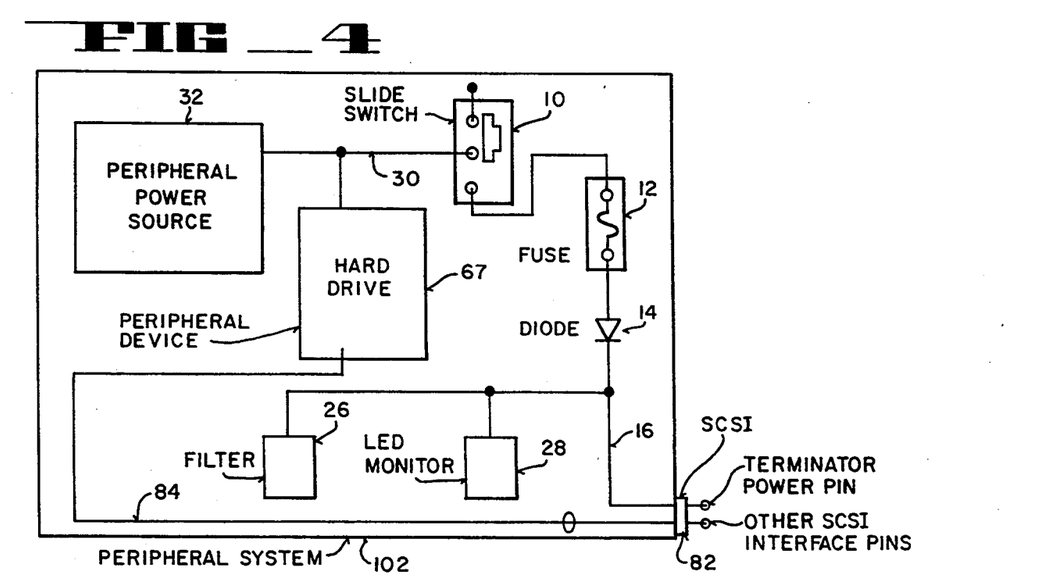
FIG. 4 is a block diagram of the present invention on a peripheral system.

FIG. 4 is a block diagram of the present invention and includes the circuit of FIG. 3 reduced to block diagram form and integrated into the peripheral system 102. Shown in reduced form in FIG. 4 are the filter arrangement 26 and the LED monitor arrangement 28. Additionally illustrated in FIG. 4 is the placement of the peripheral device hard drive 67 into the peripheral system 102. The hard drive 67 is coupled to the peripheral power source 32 via the primary power line 30 which is also coupled to the center pole of the slide switch 10. As illustrated, the SCSI port 82 is connected to the peripheral device 67 by the wire cable 84 which comprises all the insulated communication pins 1 to 24 for the SCSI interface. The terminator power pin (pin number 25) is separately coupled to the SCSI port 82 via the secondary power line 16 which also couples LED monitor 28, filter 26 and the cathode of diode 14. The anode of diode 14 is coupled to fuse 12. Fuse 12 is coupled to one outer pole of slide switch 10. Together the SCSI interface pins from the peripheral device 67 and terminator power pin of SCSI port 82 comprise the SCSI interface.

Connector port 82 is coupled the SCSI cable 110 as shown in FIG. 2(A). One end of the SCSI cable 110 is connected to the peripheral system 102 at SCSI connector 82 and the other end of cable 110 is connected to the host computer 104. Or, as shown in FIG. 2(B), the peripheral system 102 may be connected to the host computer 104 and then "daisy chained" to another peripheral system 109. When "daisy chained," peripheral 102 is connected to SCSI cable 112 which is then connected to peripheral 109 via the termination resistor network 80 ("terminator module"). The termination resistor network 80 is required on the last peripheral in the daisy chain network. When peripheral 109 is "terminated" with the terminator module 80, peripheral 102 does not need termination. The termination resistor network 80 as shown is external, but termination resistor networks can be internal to the peripheral 109. In either system (daisy chain or single peripheral), the secondary power line 16 couples directly to the SCSI interface terminator power pin.

Figure 5:
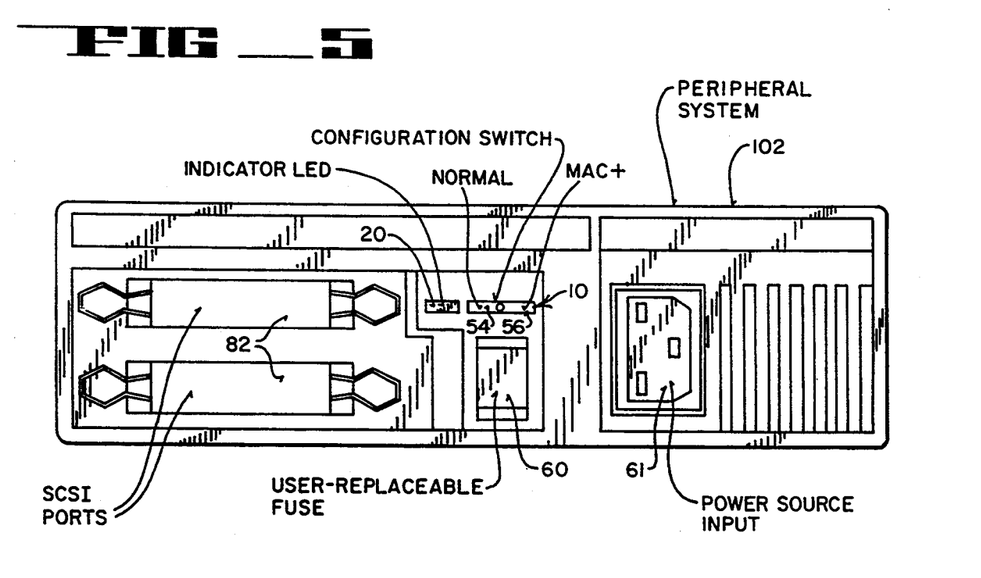
FIG. 5 is an illustration showing the outer arrangement of the assessable elements of the present invention in a typical SCSI peripheral device for the Macintosh ® computer.

The present invention is configured such that the active components of the design are user accessible from the back of the peripheral system 102 as shown in FIG. 5. The back of the peripheral system 102 is shown including the slide switch 10 (having both a NORMAL setting 54 and a MAC PLUS ("+") setting 56), monitor LED 20, SCSI ports 82, and a user replaceable fuse 60 all mounted in once section on the rear of the hard disk peripheral system 102. The user interface includes a commercially standard fuse holder assembly 60 which holds the user replaceable fuse 12 (not shown). The LED monitor 20 is displayed to the outside of the peripheral system through a small slot located above the fuse casing. Adjacent to the LED is the configuration slide switch 10. The slide switch 10 has two positions, one labeled "NORMAL" 54 and the alternate labeled "MAC PLUS" 56. Since the Macintosh ® Plus computer does not supply power on the terminator power pin of the SCSI interface, the switch setting configuration that couples the peripheral power source 32 to the terminator power pin of the SCSI port 82 has been labeled "MAC PLUS." Thus, the other setting is referred to as "NORMAL." Also in FIG. 5 are the SCSI communication interface ports 82. These connectors 82 both comprise the same SCSI port as shown in FIG. 4 and FIG. 2(A). One port 82 is used for the primary communication to the host computer 104 and the alternate port 82 is used to daisy chain other peripheral systems 109, if present.

The present invention switching mechanism performs generally as follows. A peripheral system 102 is connected to a host computer 104 via the SCSI communication interface ports 82 and 107, as illustrated in FIG. 2(A). If the terminator power pin of the SCSI interface already carries a 5 volt signal from an external power source, then the slide switch is set to the NORMAL configuration. If the SCSI interface terminator power pin does not have an eternally generated power level, then one is supplied from within the peripheral system 102 when the slide switch is in the MAC PLUS configuration. In either setting, NORMAL or MAC PLUS, the peripheral device 67 hard disk is not coupled by a power line to the SCSI terminator power pin.

The present invention switching mechanism performs specifically as follows. The peripheral hard drive units are supplied to the user with the configuration slide switch 10 in the NORMAL position (FIG. 5 position 54) that disconnects the peripheral power source 32 from the terminator power pin. The first step is connecting the peripheral system 102 to a host computer 104 (Macintosh ® computer family) via the SCSI port interface connectors (FIG. 2(A), ports 82 and 107 respectively). The host computer 104 and the peripheral system 102 are both connected to an AC power line and powered up.

As shown in FIG. 3, in the NORMAL position the leads 34 and 35 of the switch 10 are coupled together and leads 35 and 36 are electrically decoupled. Thus, in the NORMAL position the arrangement comprising the fuse 12 and the diode 14 is effectively removed from the remaining active circuit. In the NORMAL switch configuration, the switch 10 has completely decoupled the internal power supply 32 from terminator power pin of the SCSI line by decoupling the primary 30 and the secondary 16 power lines. Therefore, the SCSI interface on the peripheral system 102 requires an external power supply to provide a 5 volt DC level to the SCSI terminator power line. Without this power level, the SCSI interface will not operate properly due to lack of power supplied to the bus terminator network.

When switch 10 is in the NORMAL position and the Macintosh ® computer or another peripheral system 102 is providing power on terminator power pin of the SCSI line then a 5 volt DC level will be applied to the secondary power line 16. The filter 26 will sink to ground any switching voltage spikes. When voltage is applied on the secondary power line 16, the LED 20 will illuminate and the resister 18 will limit current flow from secondary power line 16 in order to reduce the voltage across LED 20 to a value less then 5 volts. When LED 20 illuminates and slide switch 10 is in the NORMAL configuration then the peripheral system is connected normally to the Macintosh ® computer and no other alterations need occur. The SCSI interface will operate properly in this configuration.

When configuration slide switch 10 is in the NORMAL position, no voltage will exist on the secondary power line 16 if either (i) the host computer 104 is the Macintosh ® Plus and (ii) other peripheral devices connected in the daisy chain are not suppling power on the terminator power pin. In this configuration the LED 20 will not illuminate. The LED 20 nonillumination state indicates to the user that no power is on the terminator power pin of the SCSI interface. In this state the SCSI line will not operate correctly as the terminator power pin does not carry the required power level. In this instance, the switch 10 is changed to the MAC PLUS position which will decouple leads 34 and 35 while coupling leads 35 and 36.

According to FIG. 3, when in the MAC PLUS switch configuration, the internal power supply 32 is electrically coupled to the SCSI terminator power pin by coupling the primary 30 and the secondary 16 power lines. Therefore, the peripheral system 102 supplies a 5 volt DC level to the SCSI terminator power power pin. In this configuration, other peripheral devices 109 or the host computer 104 therefore are not required to supply power on this line.

Referring to FIG. 3, when switch 10 is set on the MAC PLUS configuration the internal power supply 32 is coupled to the secondary power line 16 via the switch 10, the fuse 12 and the diode 14. A 5 volt DC level will be applied to the secondary power line 16 and to the SCSI terminator power pin. The filter 26 will sink to ground any voltage spikes that occur from the switching action or from the bus. Diode 14 is used to prevent any current from flowing up from the SCSI terminator power pin to the internal power supply 32. With the switch 10 in the MAC PLUS configuration, the LED 20 will illuminate to indicate an operative power level on the SCSI terminator power pin. In this configuration the SCSI interface operates normally.

Another function of the present invention is to provide circuitry that does not connect the SCSI interface terminator power pin to the peripheral device 67 but rather advantageously connects the SCSI terminator power pin directly to the peripheral power source 32. Refer to FIG. 1 (A). In the prior art, the peripheral device 210 is coupled directly to the SCSI interface 212 via a power line. Instead of following this arrangement, (see FIG. 4) the present invention couples the SCSI interface 82 terminator power pin directly to the peripheral power source 32, and not to the peripheral device 67. The design advantage here is that if a short circuit should occur on the SCSI terminator power pin, the peripheral device 67 will be unaffected directly. Instead, as FIG. 4 illustrates, the current will flow directly from the peripheral power source 32 through a replaceable fuse 12, then a diode 14 then to the SCSI interface 82 on terminator power pin thus completely bypassing the peripheral device 67. An important feature is that the peripheral device 67 remains unaffected by current surges since the peripheral device 67 does not couple power directly to the SCSI terminator power pin.

Refer to the block diagram of FIG. 4. Another function of the present invention is to protect the peripheral system 102 from current surges through the communication port 82 terminator power pin by use of a user replaceable fuse 12. Within a peripheral system, the use of a replaceable fuse attached to the SCSI line terminator power pin is a unique feature of the present invention. The advantage of placing a fuse 12 on the terminator power pin of the SCSI communication interface 82 is clear when read in light of the SCSI interface shorting problem; current surges through SCSI terminator power pin will simply blow the replaceable fuse 12, instead of permanently damaging the peripheral system 102, and effectively leave the remainder of the peripheral components operable.

Thus, a power line switching circuit with power line monitor for a SCSI communication interface between a host computer and peripheral system is described.

I claim:

1. A power line switching circuit for increasing reliability of a peripheral system coupled to a host computer, said power line switching circuit comprising:
   (a) a primary power line;
   (b) a peripheral power source coupled to said primary power line;
   (c) a secondary power line for coupling with a communication interface, said communication interface coupled between said peripheral system and said host computer system;
   (d) switching means coupled to said secondary power line and to said primary power line for electrically coupling said primary and said secondary power lines when said switching means is in a closed state in order to couple said communication line to said peripheral power source and for electrically decoupling said primary and secondary power lines when said switching means is in an open state in order to decouple said communication line from said peripheral power source; and
   (e) monitor means coupled to said secondary power line for indicating whether or not said secondary power line is coupled to said peripheral power source or any source of power supplied over said communication interface, said monitor means receiving a voltage level on said secondary power line as an input signal.

2. The power line switching circuit as described in claim 1 wherein said switching means is a manually operated mechanical slide switch.

3. The power line switching circuit as described in claim 1 wherein said switching means is an electrically controlled electronic switch.

4. The power line switching circuit as described in claim 1 wherein said switching means is an electrically controlled mechanical switch.

5. The power line switching circuit as described in claim 1 wherein said switching means is a manually operated electronic switch.

6. The power line switching circuit as described in claim 1 wherein said monitor means is a Light Emitting Diode.

7. The power line switching circuit as described in claim 1 wherein a fuse is coupled between said switching means and said secondary power line.

8. The power line switching circuit as described in claim 1 wherein a diode is coupled between said switching means and said secondary power line.

9. The power line switching circuit as described in claim 1 wherein coupled between said switching means and said secondary power line is a series arrangement comprising a diode and a fuse.

10. The power line switching circuit as described in claim 1 wherein said primary power line is additionally coupled to a peripheral device.

11. The power line switching circuit as described in claim 1 wherein said secondary power line is coupled to a SCSI communication interface.

12. The power line switching circuit as described in claim 1 further comprising a Macintosh ® line computer and wherein said secondary power line is coupled to a SCSI communication interface of said Macintosh ® line computer.

13. In a SCSI communication interface, a power line circuit for use within a peripheral system, said peripheral system including a power driven active peripheral device with an output and a peripheral power source for said device, said peripheral system being adapted to interface with a host computer, said power line circuit comprising:
   (a) pin means adapted to connect said peripheral system with said host computer over said SCSI communication;
   (b) power line means for coupling said pin means with said peripheral power source, said power line means bypassing said peripheral device so as to electrically isolate said output of said device from said pin means;
   (c) user replaceable fuse means coupled between said pin means and said peripheral power source;

(d) switching means coupled between said pin means and said peripheral power source for electrically coupling or decoupling said pin means from said peripheral system; and (e) monitor means coupled between said switching means and said pin means for indicating whether or not said peripheral power source, or any other power source over said SCSI communication interface, is coupled to said pin means.

14. A power line circuit for use within a peripheral system to increase peripheral system reliability, said peripheral system being adapted to interface with a host computer, said power line circuit comprising:

(a) pin means adapted to connect said peripheral system with said host computer, said pin means for coupling to a communication interface, said peripheral system comprising a power driven active peripheral device with an output and a peripheral power source for said peripheral device:

(b) power line means for coupling said pin means with said peripheral power source, said power line means bypassing said peripheral device so as to electrically isolate said peripheral device from said pin means;

(c) switching means coupled between said pin means and said peripheral power source for electrically coupling or decoupling said pin means from said peripheral system; and (d) monitor means coupled between said switching means and said pin means for indicating whether or not said pin means is coupled to said peripheral power source or any other power source over said communication interface.

15. A power line circuit for use within a peripheral system to increase peripheral system reliability as described in claim 14 wherein said communication interface is a SCSI communication interface.

16. A power line circuit for use within a peripheral system to increase peripheral system reliability as described in claim 15 wherein said peripheral device is a data storage and retrieval device.

17. In a computer system including a host computer, a peripheral system having a peripheral power source, and a communication interface for coupling said host computer with said peripheral system, the improvement for increasing peripheral system reliability, said improvement comprising:

(a) switching means for electrically coupling said peripheral power source to said communication interface and for electrically decoupling said peripheral power source from said communication interface, (b) a primary line means for coupling said peripheral power source to said switching means, and (c) a secondary line means for coupling said switching means to said communication interface, and (d) means for monitoring whether or not said peripheral power source is coupled to said secondary line means or any other power source is coupled to said secondary line means through said communication interface.

18. The improvement as recited by claim 17 wherein said peripheral power source is an integral component of said peripheral system.

19. The computer system as recited by claim 17 wherein said switch means is a manually operated mechanical slide switch.

20. The computer system as recited by claim 17 wherein said monitor means is a Light Emitting Diode.

21. The computer system as recited by claim 17 wherein said host computer is a Macintosh® computer.

22. The computer system as recited by claim 17 wherein said communication interface is a SCSI standard interface.

23. A peripheral system having increased reliability, said peripheral system comprising:

(a) a power source;

(b) at least one active peripheral device coupled to said power source;

(c) a communication interface pin, said pin for coupling to a first power line of a communication interface between a host computer and said peripheral system;

(d) a switching means for electrically coupling said power source to said communication interface pin and for electrically decoupling said power source from said communication interface pin, said power source is coupled to said switching means by a primary line and wherein said switching means is coupled to said communication interface pin by a secondary power line, and (e) monitor means coupled to said secondary line for indicating whether or not said power source is connected to said secondary line or if a power source is coupled to said secondary line through said communication interface.

24. The peripheral system as recited in claim 23 wherein said secondary line is coupled to a SCSI communications interface.

25. The peripheral system as recited in claim 23 wherein said monitor means is a Light Emitting Diode.

26. The peripheral system as recited in claim 23 wherein said switch means is a mechanical slide switch.

27. A method of selectively providing power to a SCSI communication interface comprising the steps of:

(a) coupling at least one peripheral system having its own power source to a host computer through a SCSI communication interface, said SCSI communication interface having a number of interconnect pins;

(b) detecting power levels on at least one of the pins of said SCSI communication interface; and (c) selectively coupling said power source to said SCSI communication interface or decoupling said power source from said SCSI communication interface depending on whether or not there is a power level on said one pin.

28. The method as recited in claim 27 including the step of visually indicating whether or not there is a power level on said one pin.

29. A power line switching circuit for use in supplying power to a particular line in a communication interface cooperating with a peripheral system which peripheral system is adapted to interface with a host computer, said power line switching circuit comprising:

(a) a primary power line;

(b) a peripheral power source coupled to said primary power line;

(c) a secondary power line adapted for connection with said communication interface line;

(d) a manually operated mechanical slide switch coupled to said secondary power line and to said primary power line for electrically coupling said primary and said secondary power lines when said slide switch is in a closed state in order to couple said communication line to said peripheral power source and for electrically decoupling said primary and secondary power lines when said slide switch is in an open state in order to decouple said communication line from said peripheral power source; and (e) monitor means coupled to said secondary power line for indicating whether or not said secondary power line is coupled to said peripheral power source or any other source of power, said monitor means receiving a voltage level on said secondary power line as an input signal.

* * * * *